United States Patent
Bondioli

(10) Patent No.: US 6,511,379 B2
(45) Date of Patent: Jan. 28, 2003

(54) GREASE LUBRICATION SYSTEM FOR TELESCOPIC CARDAN SHAFTS AND OTHER MECHANICAL ASSEMBLIES

(76) Inventor: Edi Bondioli, Via Gina Bianchi 18, 46029 Suzzara, Mantova (IT)

( * ) Notice: Subject to any disclaimer, the term of this patent is extended or adjusted under 35 U.S.C. 154(b) by 0 days.

(21) Appl. No.: 09/755,560

(22) Filed: Jan. 5, 2001

(65) Prior Publication Data

US 2001/0007831 A1 Jul. 12, 2001

(30) Foreign Application Priority Data

Jan. 7, 2000 (IT) .......................... FI00A0004

(51) Int. Cl.⁷ .................................. F16N 1/00
(52) U.S. Cl. .......................... 464/7; 184/15.2
(58) Field of Search ............. 464/7, 11; 184/15.2, 184/105.1; 137/118.01

(56) References Cited

U.S. PATENT DOCUMENTS

| | | | |
|---|---|---|---|
| 3,543,783 A | * 12/1970 | Ifield | 137/118.01 X |
| 4,250,909 A | * 2/1981 | Adams | 137/101 |
| 5,173,082 A | * 12/1992 | Bondioli | 464/7 |
| 5,366,043 A | * 11/1994 | Kretschmer et al. | 464/7 X |
| 5,518,183 A | * 5/1996 | Waldrum | |
| 5,669,839 A | * 9/1997 | Graf et al. | 184/15.2 X |
| 6,260,433 B1 | * 7/2001 | Aurora | 184/105.1 X |

FOREIGN PATENT DOCUMENTS

| | | | |
|---|---|---|---|
| FR | 446182 | * 11/1912 | 464/11 |
| SU | 967602 | * 10/1982 | 464/7 |
| SU | 1595600 | * 9/1990 | 464/7 |

* cited by examiner

Primary Examiner—Greg Binda
(74) Attorney, Agent, or Firm—McGlew and Tuttle, P.C.

(57) ABSTRACT

From a chamber (18), which can be supplied by a pressure greasing unit (16), there extend several branched channels (20; 22) which reach the points where the lubricant is to be supplied; a passage with a very small cross section (30, 32) is created between said chamber (18) and each branched channel (20, 22) so that a high pressure is reached inside said chamber (18) and—with injection through the grease nipple (16)—a metered supply of lubricant through each of said passages is thus obtained.

11 Claims, 5 Drawing Sheets

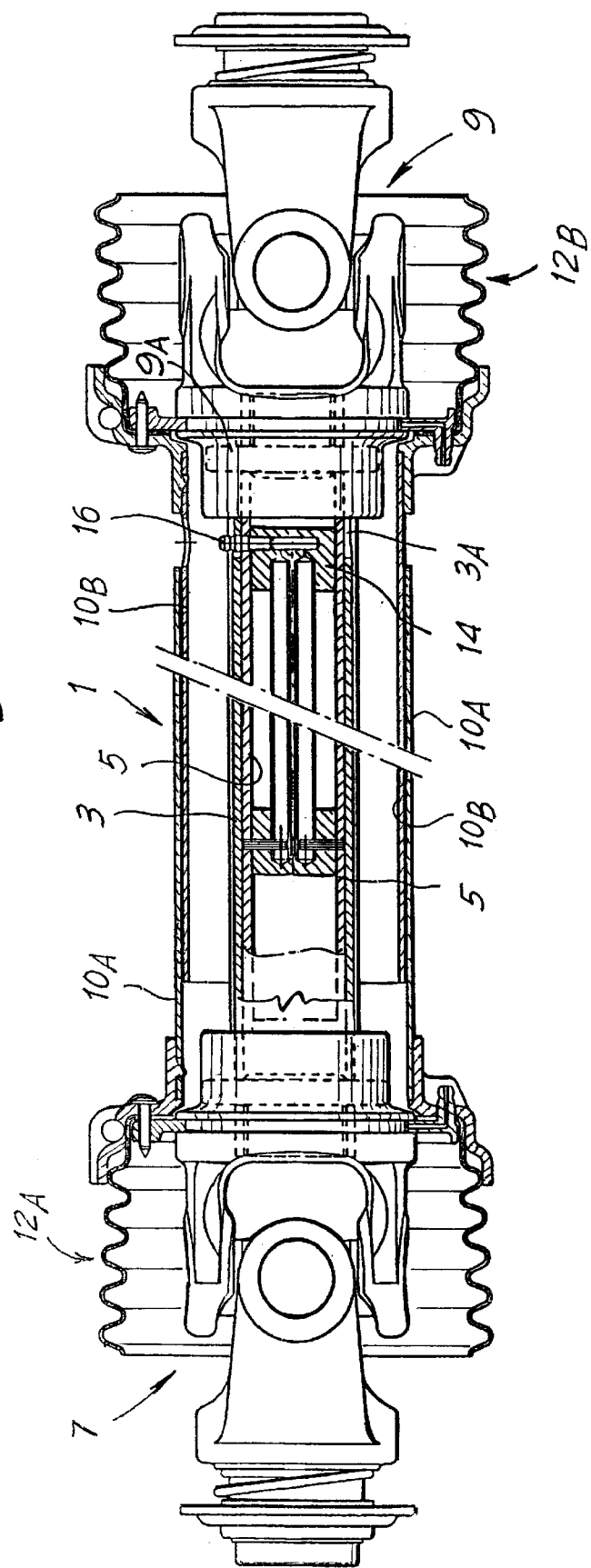

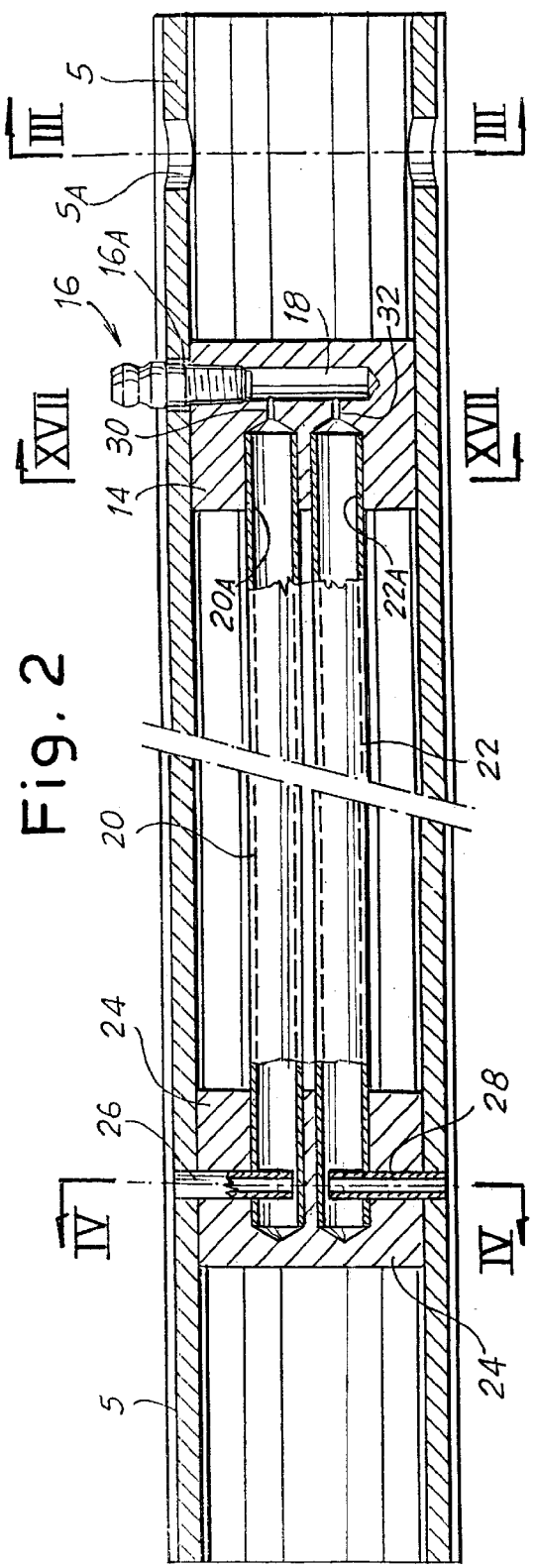
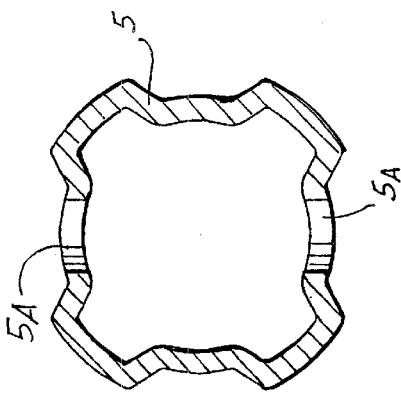
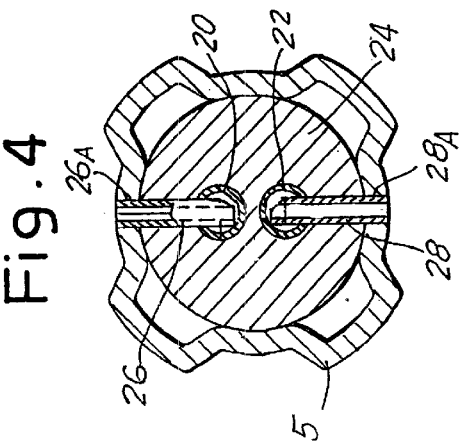

GREASE LUBRICATION SYSTEM FOR TELESCOPIC CARDAN SHAFTS AND OTHER MECHANICAL ASSEMBLIES

FIELD AND BACKGROUND OF THE INVENTION

In some mechanical assemblies—such as, for example and particularly, but not exclusively, in telescopic cardan shaft assemblies for transmission of them movement—lubrication is required at several points, using grease injected under pressure.

For the sake of operational practicality, in order to ensure lubrication at all the required points, lubrication systems have been envisaged, comprising a single grease nipple from which several points to be lubricated are supplied. These systems do not ensure uniform lubrication at all the points, use an excessive amount of lubricant and also disperse an excessive amount thereof, as well as having other drawbacks which make them unreliable, although being relatively complex and costly.

SUMMARY AND OBJECTS OF THE INVENTION

The object of the invention is to provide a simple and reliable lubrication system, as will emerge from the text which follows.

According to the invention, the grease lubrication system comprises essentially a chamber supplied by a greasing unit, several branched channels which reach the points where the lubricant is to be supplied, and, between said chamber and each branched channel, a passage with a very small cross section. In this way, a high pressure is reached inside said chamber with injection through the grease nipple and a metered supply of lubricant through each of said passages is thus obtained.

The system in question is particularly suitable for the lubrication of telescopic and cardan shafts for transmission of the movement, mainly used in vehicles, machine tools, agricultural machines and the like.

In a telescopic shaft with grooved tubular shafts, the lubrication system may comprise, in the internal shaft, a first block with the seat for the grease nipple, with said chamber and with seats for several pipes forming part of said branched channels, and in said block said passages with a small cross section are also formed. Said internal shaft also houses at least one terminal block, which is supplied by at least one or more than one of said pipes and which also houses one or more radial tubular pins, each communicating with a corresponding pipe and emerging from the internal tubular shaft at the points where lubrication is required. Basically, the terminal block may be supplied by several pipes and houses respective tubular pins which are radially distributed.

The or each terminal block may be engaged with the internal tubular shaft by means of the tubular pin or pins. Said first block may also be engaged with the internal tubular shaft by means of the greasing unit which can pass through the external tubular shaft via a terminal recess.

BRIEF DESCRIPTION OF THE DRAWINGS

In the drawings:

FIG. 1 shows an external and partially sectioned view of a telescopic cardan shaft assembly to which the present invention is applied;

FIG. 2 shows an enlarged longitudinal section through a central portion of the shaft according to FIG. 1;

FIGS. 3 and 4 are cross sections along III—III and IV—IV of FIG. 2;

DESCRIPTION OF THE PREFERRED EMBODIMENT

Figure 5:
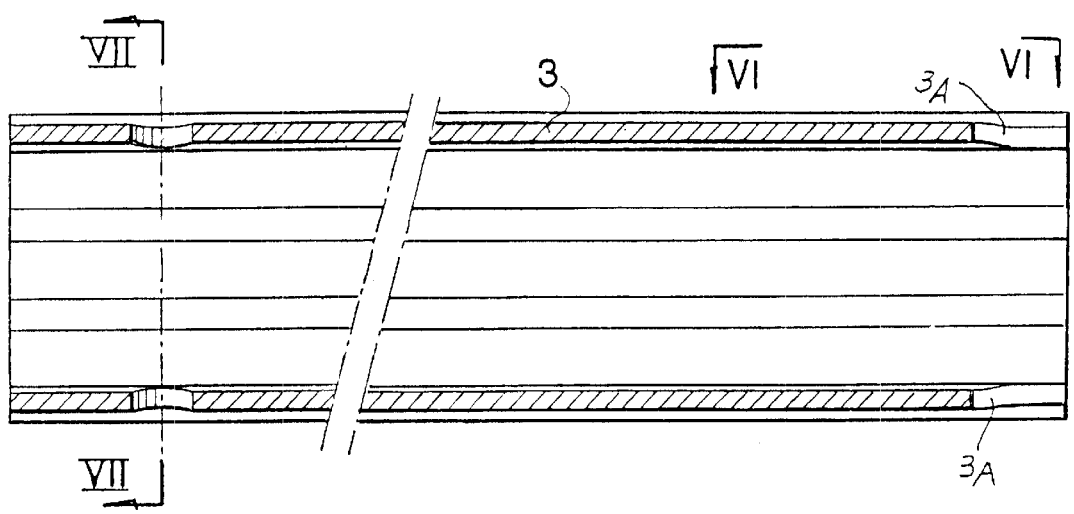
FIG. 5 shows, in isolation, a longitudinal section through the external tubular shaft.
Figure 7:
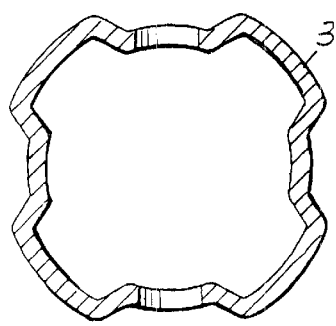
FIGS. 6, 7 and 8 show a local view along VI—VI and a cross sectional view along VII—VII of FIG. 5 and a view from the line VIII—VIII of FIG. 6.

In accordance with that illustrated in the accompanying drawing, 1 generically denotes a telescopic shaft, i.e. a shaft which may be lengthened and shortened by means of axial sliding of a pair of grooved tubular shafts, with 3 denoting the external shaft and 5 the internal shaft. In FIG. 1 said telescopic shaft is incorporated in a cardan transmission in which there is provided a fork-type cardan joint 7 of the conventional type to which the external tubular shaft 3 is joined, while 9 denotes a similar cardan joint which is joined to the internal tubular shaft 5. 10A, 10B, 12A and 12B denote a conventional cover for the cardan shafts, comprising two tubular parts which cover the tubular shaft 3, 5 and two shrouds (12A and 12B) which protect at least partially the cardan joints 7 and 9.

Cardan shafts of this type and other equivalent devices require lubrication mainly with grease, able to ensure the operability of the components in the assembly, in particular as regards—in the particular case of the cardan transmission shaft according to FIG. 1—lubrication for the relative sliding of the two tubular shafts, i.e. external tubular shaft 3 and internal tubular shaft 5. There follows hereinbelow a description of a lubrication system which is implemented in accordance with the invention and which solves the problem of efficient lubrication without local deficiencies and without excessive consumption of lubricating grease, which would constitute a financial cost and a drawback owing to the possible dispersion of lubricant in excess of that required.

Figure 8:
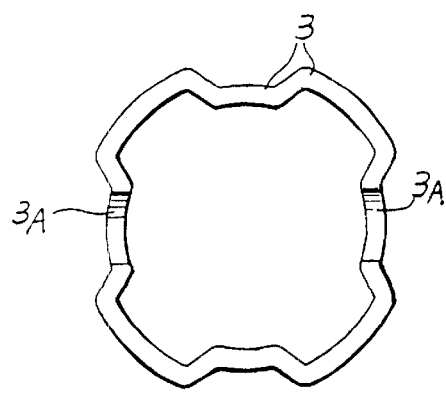
Figure 6:
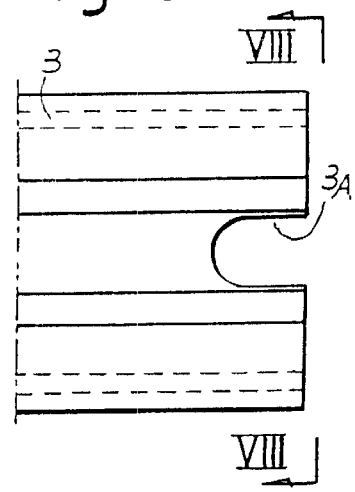
Figure 9:
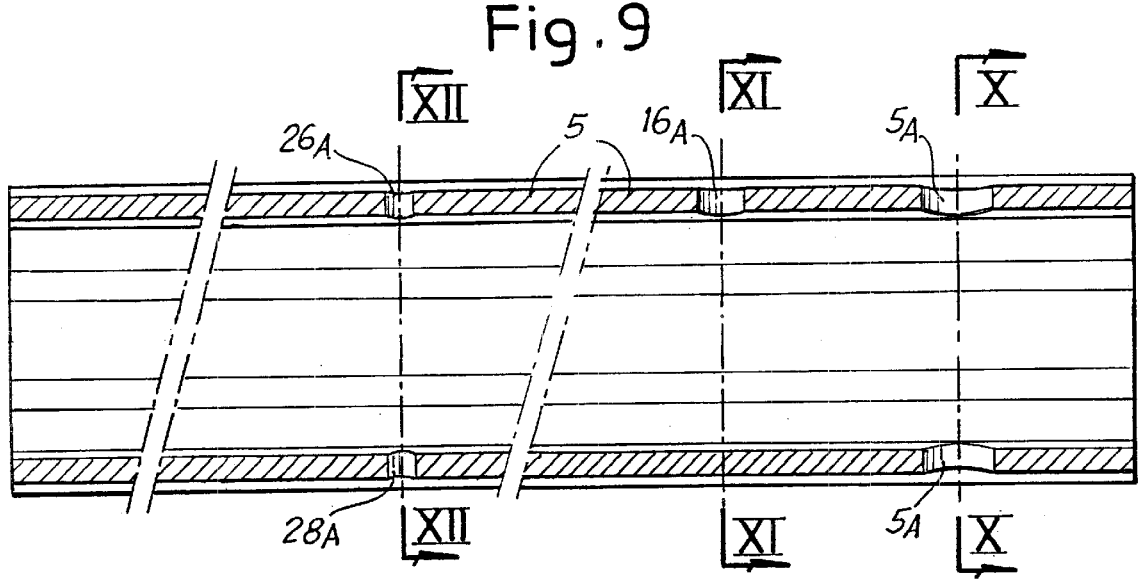
FIG. 9 shows, in isolation, a longitudinal section through the internal tubular shaft of the assembly of FIG. 1.
Figure 10:
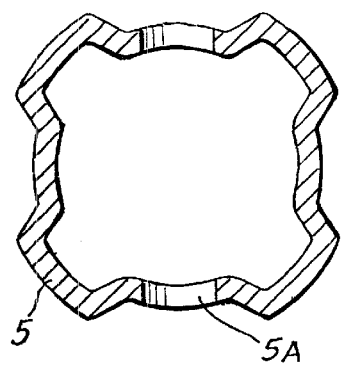
FIGS. 10, 11 and 12 show cross sections along X—X, XI—XI and XII—XII of FIG. 9.
Figure 11:
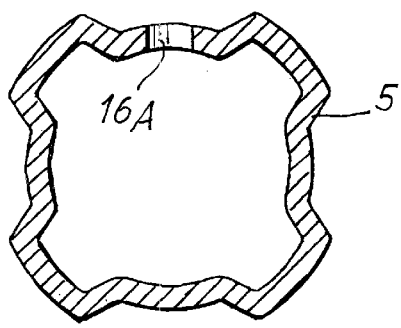
Figure 12:
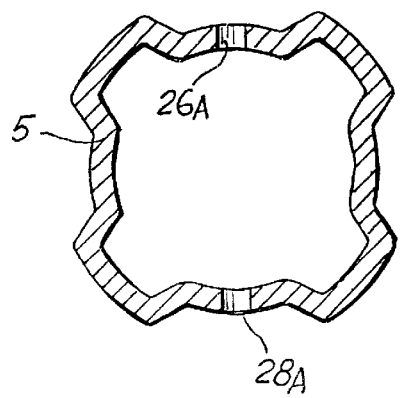
Figure 13:
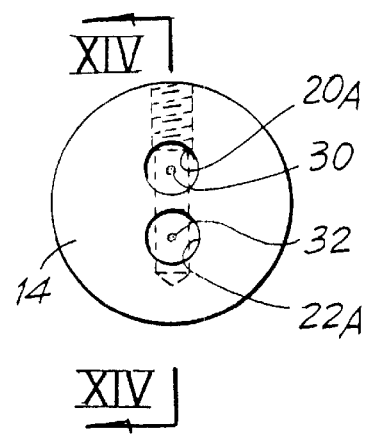
FIGS. 13 and 14 show, in isolation, an axial view along XIII—XIII of FIG. 14 and a cross sectional view along XIV—XIV of FIG. 13 of a block contained inside the internal tubular shaft of FIG. 9.
Figure 14:
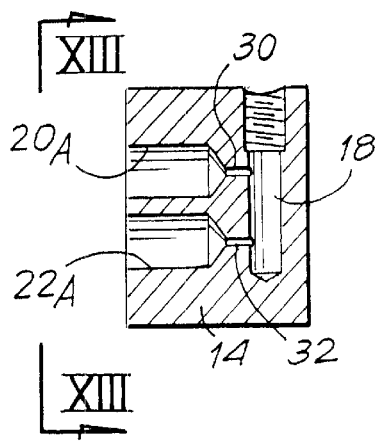
Figure 15:
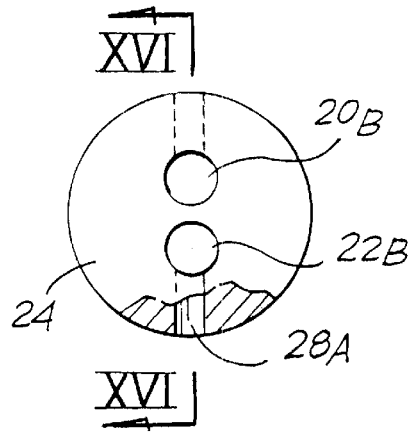
FIGS. 15 and 16 show, similar to FIGS. 13 and 14, a view along XV—XV of FIG. 16 and a sectional view along XVI—XVI of FIG. 15 of another block contained inside the internal tubular shaft.
Figure 16:
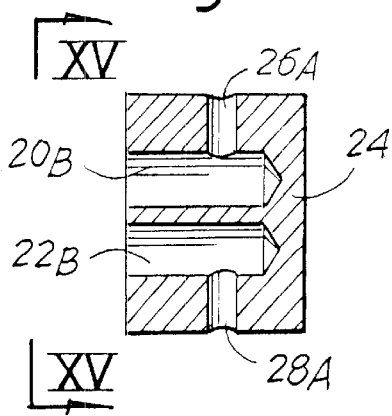

According to the example illustrated, in order to lubricate in at least two diametrically opposite points the relative sliding surfaces of the two tubular shafts 3 and 5, a block 14 is provided inside the internal tubular shaft 5 and is fitted with a grease nipple 16 of the conventional type which projects radially from a hole 16A in the tubular shaft 5 and beyond the external tubular shaft 3, also at the right-hand terminal end, when viewing the drawing, of said tubular shaft 3, owing to the presence of slits 3A which are formed along the external terminal edge of said tubular shaft 3 (see in particular FIGS. 5, 6 and 8). The seat 18 for the crease nipple 16 extends diametrically beyond the axis of the block 14 which extends in a substantially cylindrical manner. The branched channels which must reach the lubricating points of the lubrication system illustrated in FIGS. 1 to 16 depart from this seat. In this example, the branched channels are two in number and essentially consist of two pipes 20 and 22 which extend parallel to the axis of the shaft 5 and which must be supplied with the lubricant which is present in the seat 18 which forms the chamber supplying the lubricating grease which is injected under pressure through the grease nipple 16.

The two pipes 20 and 22 which depart from the first block 14 reach a further second block 24 which is also located inside the internal tubular shaft 5; this block 24 is retained in position by two tubular pins 26 and 28 which are arranged radially through holes 26A and 28A in the wall of the tubular shaft 5 and inside the block 24 so as to reach respectively the pipe 20 and the pipe 22. Therefore the branched channel consisting of the two pipes 20 and 22 is able to reach two diametrically opposite points on the external surface of the internal tubular shaft 5 so as to perform lubrication between the sliding surfaces of the two shafts 3 and 5.

Branched channels of this kind have already been envisaged in some applications of lubricating systems, but it has frequently been found that there is a considerable difference in the quantity of lubricating grease which may be supplied by the various branched channels; the lubricant may even flow only in one of the branched channels which offers least resistance to the flow of lubricant, to the detriment of the lubrication which can be achieved via the other branched channels.

In order to overcome these drawbacks, according to the invention it is envisaged to provide, between the chamber 18—which consists of the seat for the grease nipple 16 and inside which a high pressure may be reached when the grease nipple 16 is supplied—and each of the branched channels such as those consisting of the pipes 20, 22, respective passages with a very small cross section which consists of small holes 30 and 32 which are formed (see in particular FIGS. 13 and 14) between the seats 20A and 22A for the two pipes 20 and 22 inside the block 14 and the supply chamber 18. Owing to the presence of these passages with a very small cross section, consisting of the holes 30 and 32, upon injection of the lubricating grease through the grease nipple 16, a high pressure is in any case created inside the chamber 18; this high pressure ensures an outflow of the lubricating grease through each of the holes 30 and 32 which form the passages with a small cross section, so as to thus supply in each case a desired or metered quantity of lubricant to each of the branched channels such as those consisting of the pipe 20 and of the tubular pin 26 and of the pipe 22 and of the tubular pin 28. The high pressure reached inside the supply chamber 18 ensures in any case the possibility of supplying the lubricating grease through the even relatively very small holes 30 and 32, because said pressure ensures that said passages 30 and 32 remain clear, even if some accidental obstruction should occur inside said passages 30 and 32. Downstream of the passages with a small cross section consisting of the holes 30 and 32, the outflow of the lubricant inside the individual branched channels is ensured practically without any obstacles, because there is no resistance to the outflow of the lubricant in said branched channels due to the amplitude of the through-apertures provided therein.

The arrangement described above is extremely simple both in terms of construction and in terms of assembly since the blocks 14 and 24 may be easily manufactured also so as to be very similar to each other; the drilling operations for housing the pipes 20 and 22 in said blocks are equally simple, as are simple the machining operations for seating the tubular pins 26 and 28 and for creating the supply chamber 18 consisting simply of the extension of the seat for engagement of the grease nipple 16. The grease nipple 16 may also be seated in an eyelet or in a hole in the shaft 5, which may also be greater—to a limited degree—than that which is required in order for the grease nipple 16 to pass through. Machining of the shaft 5 with the holes for the grease nipple 16 and for the pins 26 and 27 is also easy since it is a question of completing, with these bores, the boring operation which is in any case required for the shaft 5, which must have holes 5A for the pin 9A engaging the tubular shaft 5 with the cardan joint 9.

The supply of lubricant which occurs at the grease outlet points consisting of the external ends of the tubular pins 26 and 28 is in any case ensured both by the axially variable relative position of the external tubular shaft 3 and internal tubular shaft 5.

In order to ensure the flow of the lubricant from the pipes 20 and 22 to the respective tubular pins 26 and 28, it is also possible to envisage simple transverse smoothing of the internal ends of the pins 26 and 28 in order to create passages sufficiently large for entry of the lubricant into the axial holes of said pins 26 and 28; however, a recess may also be formed at least in the internal ends or in each of the ends of each pin in order to ensure said passage of the lubricant in all cases.

FIGS. 13 and 14 and FIGS. 15 and 16 show the form of the blocks 14 and 24, respectively. It should be noted that machining of these blocks is easy both for the formation of the chamber 18 and the seats 20A and 22A for the terminal ends of the pipes 20 and 22 and for the formation of the seats 26A and 28A for the pins 26 and 28. The holes 30 and 32 with a very small cross section, provided between the pipes 20 and 22 and the chamber 18, may also be easily formed since they are advantageously aligned with the seats 20A and 22A.

Figure 17:
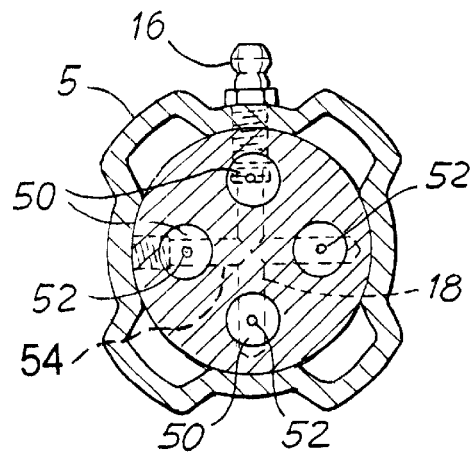
FIG. 17 shows a cross sectional view of a variation of embodiment, along the line indicated by XVII—XVII in FIG. 2 (relating to the example of FIGS. 1 to 16).

When more than two branched channels such as those described are required, it is possible to form seats for the pipes in the blocks such as those 14 and 24, in the required number and with the formation of the holes with a small cross section, such as those 30 and 32, also between these additional seats and the chamber 18. FIG. 17 shows four branched channels (instead of two) between the chamber 18 and the grease nipple 16, with two further seats 50, similar to those 20A and 22A, being envisaged, with the respective holes with a small cross section denoted by 52, and with communication being provided between these holes 52 and the chamber 18 by means of a radial hole 54 which intersects the hole which forms the pressure chamber 18. Such an arrangement could also be provided so as to form, for example, six branched channels instead of two and instead of four as illustrated in FIGS. 1 to 16 and in FIG. 17, with a hexagonal—instead of a square—arrangement of the axes of the seats for the pipes such as those 20 and 22. It is also possible to envisage branched pipes extending on opposite sides of the block 14.

It is understood that the drawing shows only an example provided merely by way of practical demonstration of the invention, whereby the forms and arrangements of said invention may vary without departing from the concept underlying said invention. The purpose of any reference numbers present in the accompanying claims is merely to facilitate reading of the claims with reference to the description and to the drawing and does not limit the protective scope defined by the claims.

What is claimed is:

1. A telescopic shaft with a grease lubricating system, the shaft comprising:

an external tubular shaft and an internal shaft mutually slidable and rotationally constrained, a chamber supplied by a pressure greasing unit, a plurality of branched channels extending to points where lubricant is to be supplied, a passage with a cross section is provided between said chamber and each said branched channel to create a high pressure inside said chamber with injection of grease through a grease nipple, said cross section is of a size to provide a metered supply of lubricant through each of said passages.

2. Telescopic shaft as claimed in claim 1, wherein:

said shafts are grooved tubular shafts, the internal shaft houses a first block with a seat for the pressure greasing unit, houses said chamber, houses seats for several pipes forming part of said branched channels, and houses said passages with said cross section, and furthermore houses at least one additional terminal block which is supplied by at least one of said pipes and which houses at least one or more radial tubular pins communicating with the one of said pipes or with each pipe and emerging from the internal tubular shaft at points where lubrication is required.

3. Telescopic shaft as claimed in claim 2, wherein:

said additional terminal block is supplied by several pipes houses respective tubular pins.

4. Telescopic shaft as claimed in claim 3, wherein:

said additional terminal block is engaged with the internal tubular shaft by the tubular pin or pins.

5. Telescopic shaft as claimed in claim 2, wherein:

said additional terminal block is engaged with the internal tubular shaft by the tubular opin or pins.

6. Telescopic shaft as claimed in claim 2, wherein:

said first block is engaged with the internal tubular shaft by means of the pressure greasing unit which passes through the external tubular shaft via a terminal recess or via a slit.

7. A lubricating system comprising:

an external shaft having an inner surface;

an internal shaft having an outer surface forming an axially sliding interface with said inner surface of said external shaft, said internal shaft defining a lubrication chamber, said internal shaft defining first and second lubrication channels in communication with different areas of said sliding interface, said internal shaft also defining first and second passages each having a cross section smaller than said lubrication chamber and said first and second lubrication channels, each of said first and second passages having one end in communication with said lubrication chamber, another end of said first passage being in communication with said first lubrication channel, another end of said second passage being in communication with said second lubrication channel.

8. A system in accordance with claim 7, wherein:

said internal shaft has an end which defines said lubrication chamber;

said lubrication chamber is arranged radially within said outer surface of said internal shaft;

said first and second lubrication channels are arranged radially within said outer surface of said internal shaft.

9. A system in accordance with claim 7, further comprising:

a lubrication fitting connected to said internal shaft and in communication with said lubrication chamber, said lubrication fitting passing lubrication into, and holding lubrication in, said lubrication chamber.

10. A system in accordance with claim 7, further comprising:

a first cardan joint connected to said internal shaft;

a second cardan joint connected to said external shaft, said first and second cardan joints being arranged at opposite ends of said internal and external shafts.

11. A system in accordance with claim 7, wherein:

said internal and external shafts are rotationally fixed together.

* * * * *